United States Patent
An Chang et al.

(10) Patent No.: US 7,146,036 B2
(45) Date of Patent: Dec. 5, 2006

(54) MULTIFRAME CORRESPONDENCE ESTIMATION

(75) Inventors: Nelson Liang An Chang, Palo Alto, CA (US); Amir Said, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 913 days.

(21) Appl. No.: 10/356,858

(22) Filed: Feb. 3, 2003

(65) Prior Publication Data
US 2004/0151365 A1 Aug. 5, 2004

(51) Int. Cl.
*G06K 9/00* (2006.01)
(52) U.S. Cl. .................... 382/154; 345/419; 356/601
(58) Field of Classification Search ................ 382/100, 382/154; 345/419, 426, 427; 356/601; 250/559.22
See application file for complete search history.

(56) References Cited

U.S. PATENT DOCUMENTS

| | | | |
|---|---|---|---|
| 6,028,672 A * | 2/2000 | Geng .................... | 356/602 |
| 6,147,760 A | 11/2000 | Geng | |
| 6,252,623 B1 | 6/2001 | Lu et al. | |
| 6,341,016 B1 | 1/2002 | Malione | |
| 6,369,879 B1 | 4/2002 | Pedersen | |
| 6,400,365 B1 * | 6/2002 | Setoguchi ................ | 345/427 |
| 6,437,782 B1 * | 8/2002 | Pieragostini et al. ....... | 345/426 |
| 7,075,533 B1 * | 7/2006 | Oka ..................... | 345/426 |
| 2002/0021287 A1 | 2/2002 | Tomasi et al. | |
| 2002/0057438 A1 * | 5/2002 | Decker ................ | 356/601 |
| 2003/0030639 A1 * | 2/2003 | Ritter ..................... | 345/426 |
| 2005/0190181 A1 * | 9/2005 | Sakagawa et al. ......... | 345/419 |

FOREIGN PATENT DOCUMENTS

WO     WO 00/70303     11/2000

OTHER PUBLICATIONS

Olaf Hall-Holt et al., "Stripe Boundary Codes for Real-Time Structured-Light Range Scanning of Moving Objects," Stanford University, pp. 1-8 (2001).
Jens Guhring et al., "Data Processing and Calibration of a Cross-Pattern Stripe Projector," IAPRS, vol. XXXIII, 12 pages (2000).
Li Zhang et al., "Rapid Shape Acquisition Using Color Structured Light and Muli-Pass Dynamic Programming," University of Washington, 13 pages (1999).
Szymon Rusinkiewicz, "Real-Time 3D Model Acquisition," Stanford University, 9 pages (1999).

(Continued)

*Primary Examiner*—Vikkram Bali
*Assistant Examiner*—Anand Bhatnagar

(57) ABSTRACT

Systems and methods of multiframe correspondence estimation are described. Light patterns reflected from the scene are captured at one or more capture planes. In one aspect, a sequence of patterns of light symbols that temporally encode two-dimensional position information in a projection plane with unique light symbol sequence codes is projected onto a scene. A correspondence mapping between multipixel regions in the capture plane and corresponding regions in the projection plane is computed based at least in part on correspondence between light symbol sequence codes captured at the capture plane and light symbol sequence codes projected from the projection plane. In another aspect, the patterns consist of a single plane of light that is swept across the scene. Correspondence is determined based at least in part on exploiting the epipolar constraint associated with any pair of cameras.

46 Claims, 8 Drawing Sheets

OTHER PUBLICATIONS

J. Batlle et al., "Recent Progress in Coded Structured Light as a Technique to Solve the Correspondence Problem: A Survey," Pattern Recognition, vol. 31, No. 7, pp. 963-982 (1998).

K. L. Boyer et al., "Color-Encoded Structured Light for Rapid Active Ranging," IEEE Transactions on Pattern Analysis and Machine Intelligence, vol. PAMI-9, No. 1, pp. 14-28 (Jan. 1987).

Kosuke Sato et al., "Three-Dimensional Surface Measurement by Space Encoding Range Imaging," Journal of Robotic Systems, vol. 2(1), pp. 27-39 (1985).

J. L. Posdamer et al., "Surface Measurement by Space-Encoded Projection Beam Systems," Computer Graphics and Image Processing, vol. 18, pp. 1-17 (1982).

* cited by examiner

MULTIFRAME CORRESPONDENCE ESTIMATION

TECHNICAL FIELD

This invention relates to systems and methods of multiframe correspondence estimation.

BACKGROUND

Solving the correspondence problem is a classic problem in computer vision and image processing literature. It is a central to many 3-D (three-dimensional) related applications including stereopsis, 3-D shape recovery, camera calibration, motion estimation, view interpolation, and others. The correspondence problem involves finding a mapping relating points in one coordinate system to those in a second (or more) coordinate system (e.g., the mapping between pixels in one image of a given 3-D scene to those in a second image).

The traditional method for solving the correspondence problem uses image information directly. The correspondence mapping is determined for every pixel by examining its neighborhood and exploiting color consistency. In this approach an objective function (e.g. maximize correlation or minimize some error metric) is optimized for a given point in one image to find its corresponding match in all the other images. This passive approach works well for scenes that are distinctly textured and have consistent textures across all the images. This approach has difficulty when the scene is more uniform in color or when the illumination varies across the images. Typically, this approach produces only a sparse set of correspondences reliably and becomes more difficult for an arbitrary number of images. The matching algorithms that typically are used in this approach often are designed to establish correspondences between only two frames at a time, in which case $\frac{1}{2} \cdot K \cdot (K-1)$ dual-frame matches are required K cameras.

In contrast, structured light scanning algorithms traditionally use a calibrated camera-projector pair to recover 3-D shape information. In these approaches, a single active column in the projector's coordinate system results in a plane of light. The active plane of light is projected onto the scene of interest and the resulting contour is imaged by the camera. Then, for any image pixel p on the contour, its corresponding 3-D point is found by intersecting the 3-D ray passing through p and the 3-D plane equation.

Instead of specifying each plane individually, the planes may be specified in parallel using a set of temporally encoded patterns. Light patterns may be formed simply by considering the bitplanes of the binary representation of the column indices. The spatially varying light patterns form a temporal encoding of the columns in the projector's coordinate system. Every light pattern, consisting of binary vertical stripes of varying widths, is projected in succession. The camera decodes the projected patterns and builds up the appropriate bit sequence at every pixel location. Hence, given a pixel location in the camera, the corresponding column in the projector's coordinate system may be determined, and the corresponding 3-D point then may be calculated. Greater 3-D accuracy may be achieved by considering the transitions between adjacent columns.

The above-mentioned approaches based on temporally encoded patterns work well for arbitrary static scenes with a calibrated setup. There have been many approaches to further improve on the design of the projected light patterns and reduce the total number used. In one approach that requires a labeling process and a particular camera configuration, an uncoded grid pattern with landmark dots is projected. In another approach, a single color pattern is used to handle only neutrally colored scenes. Other approaches use sophisticated binary patterns and matching algorithms to capture dynamic but not very textured scenes.

SUMMARY

The invention features systems and methods of multiframe correspondence estimation.

In one aspect of the invention, a sequence of patterns of light symbols that temporally encode two-dimensional position information in a so-called projection plane with unique light symbol sequence codes is projected onto a scene. Light patterns reflected from the scene are captured at one or more so-called capture planes. A correspondence mapping between multipixel regions in the capture plane and corresponding regions in the projection plane is computed based at least in part on correspondence between light symbol sequence codes captured at the capture plane and light symbol sequence codes projected from the projection plane.

In another aspect of the invention, a sequence of patterns of light symbols that temporally encode two-dimensional position information in a projection plane with unique light symbol sequence codes is projected onto a scene. At least two light patterns encode position information at different spatial resolutions. Light patterns reflected from the scene are captured at a capture plane. A correspondence mapping between the capture plane and the projection plane is computed based at least in part on correspondence between light symbol sequence codes captured at the capture plane and light symbol sequence codes projected from the projection plane.

In another aspect of the invention, a plane of light is projected onto a scene and is swept across the scene. Light contours reflected from the scene are captured at multiple capture planes, each pair of which is related by epipolar geometry with respect to the scene. A correspondence mapping between each pair of capture planes is computed based at least in part on intersection of captured light contours and epipolar lines computed for each of the capture planes.

In another aspect of the invention, a first light pattern is projected onto a scene. Light patterns reflected from the scene are captured at a capture plane. A coarse correspondence mapping between the capture plane and a reference plane is computed based at least in part on the captured light patterns. One or more undersampled regions of the scene are identified based at least in part on the computed coarse correspondence mapping. A second light pattern different from the first light pattern is projected onto the undersampled regions of the scene. A refined correspondence mapping between the capture plane and the reference plane is computed based at least in part on the light patterns captured during projection of the second light pattern.

The invention also features systems for implementing the above-described multiframe correspondence estimation methods.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Overview

A. Process Overview

Figure 1:
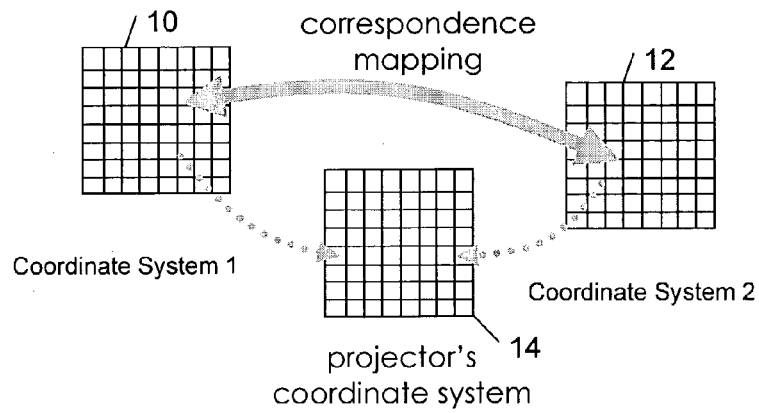
FIG. 1 is diagrammatic view of a correspondence mapping between two camera coordinate systems and their relation to the projection plane.

FIG. 1 illustrates an example of a correspondence mapping between the coordinate systems of two imaging devices 10, 12 (each of these is referred to herein as a capture plane). In some embodiments described below, a correspondence mapping is computed by relating each capture plane to a third coordinate system 14 (referred to herein as the projection plane). The resulting mapping may serve, for example, as the first step in camera calibration, view interpolation, and 3-D shape recovery.

The multiframe correspondence estimation embodiments described below may be implemented as reasonably fast and low cost systems for recovering dense correspondences among one or more imaging devices. These embodiments are referred to herein as Light Undulation Measurement Analysis (or LUMA) systems and methods. The illustrated LUMA embodiments include one or more computer-controlled and stationary imaging devices and a fixed light source that is capable of projecting a known light pattern onto a scene of interest. Recovery of the multiframe correspondence mapping is straightforward with the LUMA embodiments described below. The light source projects known patterns onto an object or 3-D scene of interest, and light patterns that are reflected from the object are captured by all the imaging devices. Every projected pattern is extracted in each view and the correspondence among the views is established. Instead of attempting to solve the difficult correspondence problem using image information alone, LUMA exploits additional information gained by the use of active projection. In some embodiments, intelligent temporal coding is used to estimate correspondence mappings, whereas other embodiments use epipolar geometry to determine correspondence mappings. The correspondence mapping information may be sued directly for interactive view interpolation, which is a form of 3-D media. In addition, with simple calibration, a 3-D representation of the object's shape may be computed easily from the dense correspondences.

B. System Overview

Figure 2:
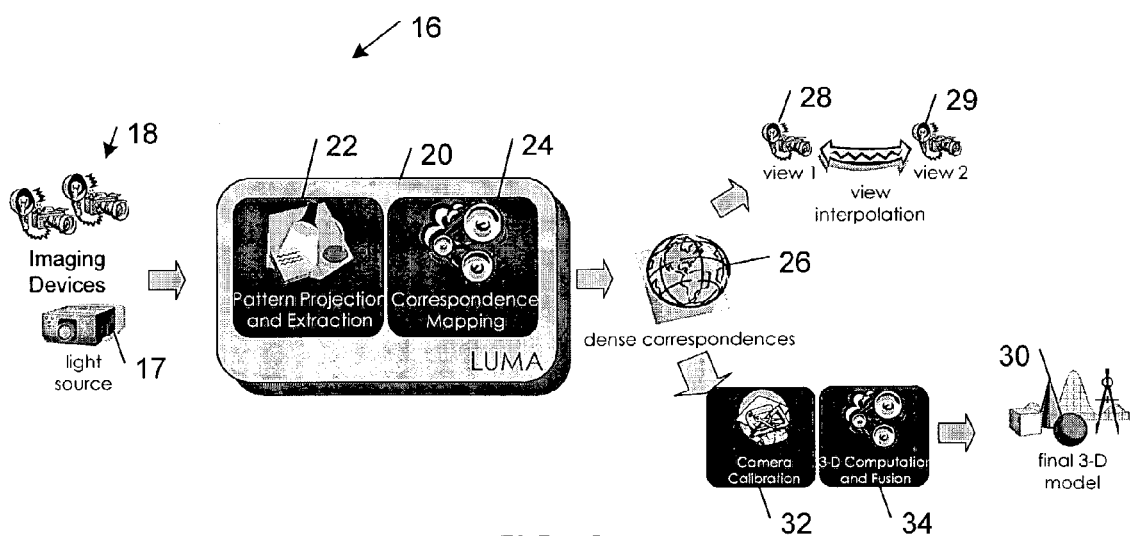
FIG. 2 is a diagrammatic view of an embodiment of a system for estimating a correspondence mapping.

Referring to FIG. 2, in some embodiments, a LUMA system 16 for estimating a correspondence mapping includes a light source 17, one or more imaging devices 18, a processing system 20 that is operable to execute a pattern projection and extraction controller 22 and a correspondence mapping calculation engine 24. In operation, pattern projection and extraction controller 22 is operable to choreograph the projection of light onto a scene and the capture of reflected light at each of the imaging devices 18. Based at least in part on the captured light, correspondence mapping calculation engine 24 is operable to compute a correspondence mapping 26 between different views of the scene. The correspondence mapping 26 may be used to interpolate different views 28, 29 of the scene. The correspondence mapping 26 also may be used to compute a 3-D model 30 of the scene after camera calibration 32 and 3-D computation and fusion 34.

In some embodiments, processing system 20 is implemented as a computer (or workstation) and pattern projection and extraction controller 22 and correspondence mapping calculation engine 24 are implemented as one or more software modules that are executable on a computer (or workstation). In general, a computer (or workstation) on which calculation engine 24 may execute includes a processing unit, a system memory, and a system bus that couples the processing unit to the various components of the computer. The processing unit may include one or more processors, each of which may be in the form of any one of various commercially available processors. The system memory typically includes a read only memory (ROM) that stores a basic input/output system (BIOS) that contains start-up routines for the computer, and a random access memory (RAM). The system bus may be a memory bus, a peripheral bus or a local bus, and may be compatible with any of a variety of bus protocols, including PCI, VESA, Microchannel, ISA, and EISA. The computer also may include a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital video disks) also may be used with the computer. A user may interact (e.g., enter commands or data)

with the computer using a keyboard and a mouse. Other input devices (e.g., a microphone, joystick, or touch pad) also may be provided. Information may be displayed to the user on a monitor or with other display technologies. The computer also may include peripheral output devices, such as speakers and a printer. In addition, one or more remote computers may be connected to the computer over a local area network (LAN) or a wide area network (WAN) (e.g., the Internet).

There are a variety of imaging devices 18 that are suitable for LUMA. The imaging devices typically remain fixed in place and are oriented toward the object or scene of interest. Image capture typically is controlled externally. Exemplary imaging devices include computer-controllable digital cameras (e.g., a Kodak DCS760 camera), USB video cameras, and Firewire/1394 cameras. USB video cameras or "webcams," such as the Intel PC Pro, generally capture images 30 fps (frames per second) at 320×240 resolution. The frame rate drastically decreases when multiple cameras share the same bus. Firewire cameras (e.g., Orange Micro's Ibot, Point Grey Research's Dragonfly) offer better resolution and frame rate (640×480 at 30 fps) and may be used simultaneously with many more cameras. For example, in one implementation, four Dragonfly cameras may be on the same Firewire bus capturing VGA resolution at 15 fps or more.

Similarly, a wide variety of different light sources 17 may be used in the LUMA embodiments described below. Exemplary light sources include a strongly colored incandescent light projector with vertical slit filter, laser beam apparatus with spinning mirrors, and a computer-controlled light projector. In some embodiments, the light source 17 projects a distinguishable light pattern (e.g., vertical plane of light or a spatially varying light pattern) that may be detected easily on the object. In some embodiments, the light source and the imaging devices operate in the visible spectrum. In other embodiments, the light source and the imaging devices may operate in other regions (e.g., infrared or ultraviolet regions) of the electromagnetic spectrum. The actual location of the light source with respect to the imaging devices need not be estimated. The illustrated embodiments include a computer-controlled light projector that allows the projected light pattern to be dynamically altered using software.

The LUMA embodiments described herein provide a number of benefits, including automatic, flexible, reasonably fast, and low-cost approaches for estimating dense correspondences. These embodiments efficiently solve dense correspondences and require relatively little computation. These embodiments do not rely on distinct and consistent textures and avoid production of spurious results for uniformly colored objects. The embodiments use intelligent methods to estimate multiframe correspondences without knowledge of light source location. These LUMA embodiments scale automatically with the number of cameras. The following sections will describe these embodiments in greater detail and highlight these benefits. Without loss of generality, cameras serve as the imaging devices and a light projector serves as a light source.

II. Intelligent Temporal Coding

A. Overview

This section describes embodiments that use intelligent temporal coding to enable reliable computation of dense correspondences for a static 3-D scene across any number of images in an efficient manner and without requiring calibration. Instead of using image information alone, an active structured light scanning technique solves the difficult multiframe correspondence problem. In some embodiments, to simplify computation, correspondences are first established with respect to the light projector's coordinate system (referred to herein as the projection plane), which includes a rectangular grid with w×h connected rectangular regions. The resulting correspondences may be used to create interactive 3-D media, either directly for view interpolation or together with calibration information for recovering 3-D shape.

The illustrated coded light pattern LUMA embodiments encode a unique identifier corresponding to each projection plane coordinates by a set of light patterns. The cameras capture and decode every pattern to obtain the mapping from every camera's capture plane to the projection plane. These LUMA embodiments may use one or more cameras with a single projector. In some embodiments, binary colored light patterns, which are oriented both horizontally and vertically, are projected onto a scene. The exact projector location need not be estimated and camera calibration is not necessary to solve for dense correspondences. Instead of solving for 3-D structure, these LUMA embodiments address the correspondence problem by using the light patterns to pinpoint the exact location in the projection plane. Furthermore, in the illustrated embodiments, the decoded binary sequences at every image pixel may be determined directly to determine the location in the projection plane without having to perform any additional computation or searching.

Figure 3:
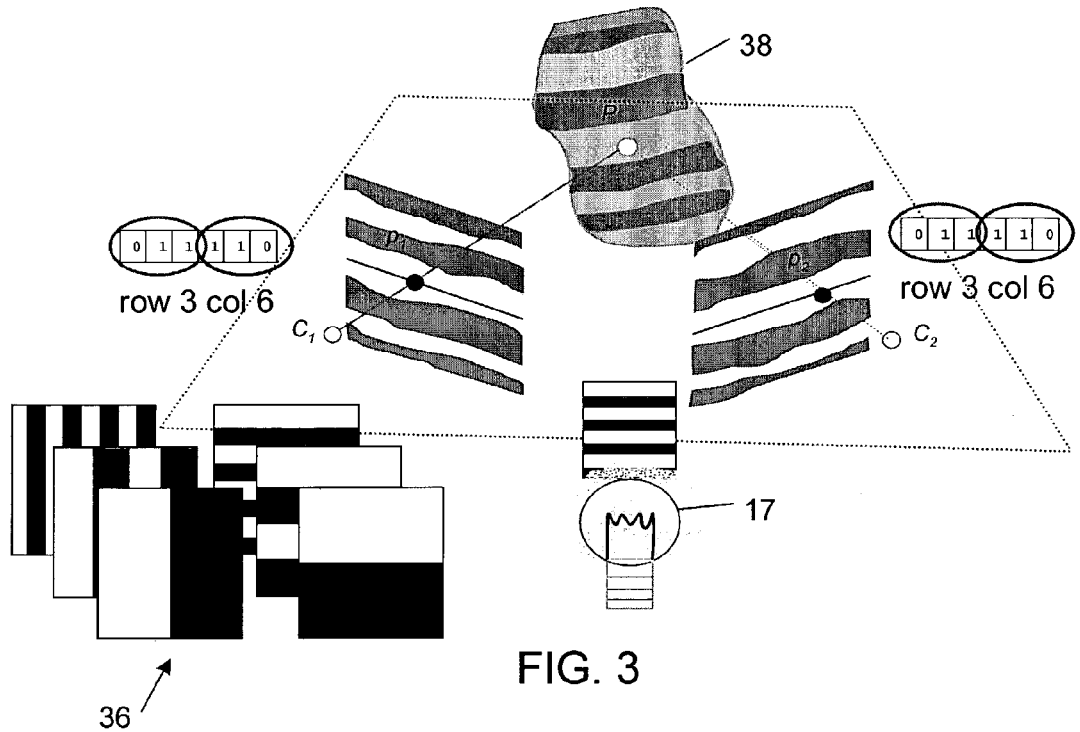
FIG. 3 is a diagrammatic view of an embodiment of a system for estimating a correspondence mapping.

Referring to FIG. 3, in one embodiment, the exemplary projection plane is an 8×8 grid, where the lower right corner is defined to be (0,0) and the upper left corner is (7,7). Only six light patterns 36 are necessary to encode the sixty-four positions. Each pattern is projected onto an object 38 in succession. Two cameras $C_1$, $C_2$ capture the reflected patterns, decode the results, and build up bit sequences at every pixel location in the capture planes. Once properly decoded, the column and row may be immediately determined. Corresponding pixels across cameras will automatically decode to the same values. In the illustrated embodiment, both p1 and p2 decode to (row, column)=(3,6).

The following notation will be used in the discussion below. Suppose there are K+1 coordinate systems (CS) in the system, where the projection plane is defined as the $0^{th}$ coordinate system and the K cameras are indexed 1 through K. Let lowercase boldface quantities such as p represent a 2-D point $(p_w, p_v)$ in local coordinates. Let capital boldface quantities such as P represent a 3-D vector $(p_x, p_y, p_z)$ in the global coordinates. Suppose there are a total of N light patterns to be displayed in sequence, indexed 0 through N−1. Then, define image function $I_k(p;n)=C$ as the three-dimensional color vector C of CS k at point p corresponding to light pattern n. Note that $I_0(\bullet;n)$ represents the actual light pattern n defined in the projection plane. Denote $V_k(p)$ to be the indicator function at point p in camera k. A point p in camera k is defined to be valid if and only if $V_k(p)=1$. Define the mapping function $M_{ij}(p)=q$ for point p defined in CS i as the corresponding point q defined in CS j. Note that these mappings are bi-directional, i.e. if $M_{ij}(p)=q$, then $M_{ji}(q)=p$. Also, if points in two CS's map to the same point in a third CS (i.e. $M_{ik}(p)=M_{jk}(r)=q$), then $M_{ij}(p)=M_{kj}(M_{ik}(p))=r$.

The multiframe correspondence problem is then equivalent to the following: project a series of light patterns $I_0(\bullet;n)$ and use the captured images $I_k(\bullet;n)$ to determine the mappings $M_{ij}(p)$ for all valid points p and any pair of cameras i and j. The mappings may be determined for each camera independently with respect to the projection plane since from above $$M_{ij}(p)=M_{0j}(M_{i0}(p))$$

Figure 4:
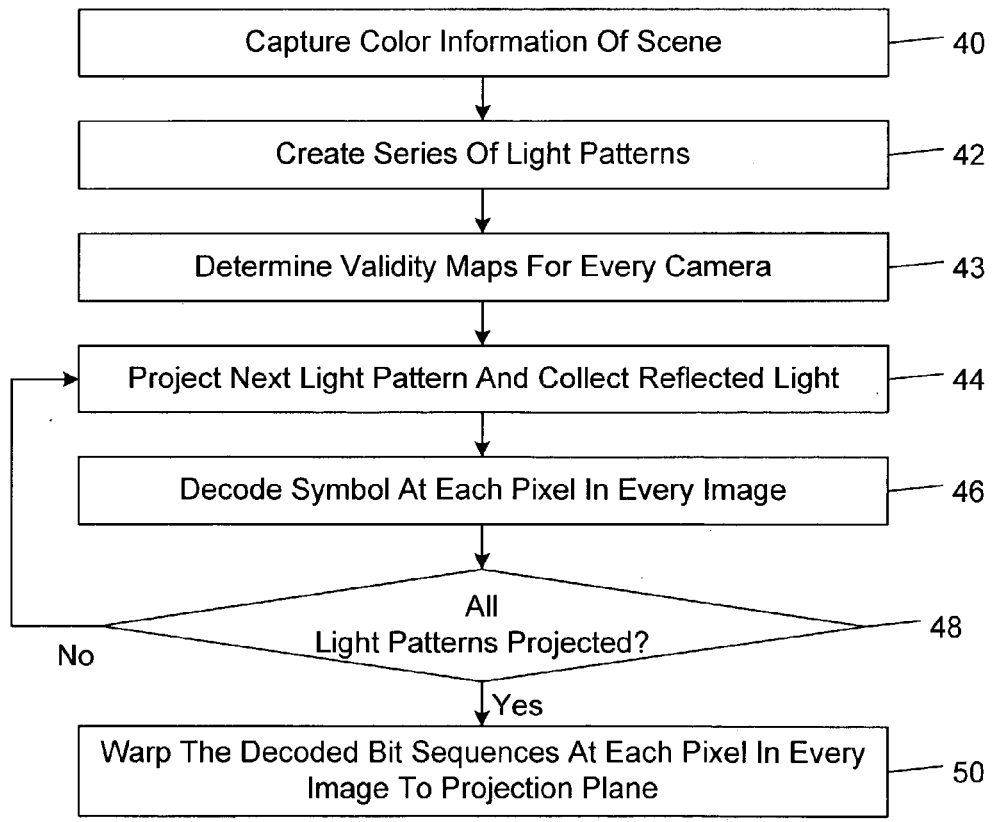
FIG. 4 is a flow diagram of an embodiment of a method of estimating a correspondence mapping.

Referring to FIG. 4, in some embodiments, the LUMA system of FIG. 3 for estimating multiframe correspondences may operate as follows.
1. Capture the color information of the 3-D scene 38 from all cameras (step 40). These images serve as the color texture maps in the final representation.
2. Create the series of light patterns 36 to be projected (step 42). This series includes reference patterns that are used for estimating the projected symbols per image pixel in the capture plane.
3. Determine validity maps for every camera (step 43). For every pixel p in camera k, $V_k(p)=1$ when the inter-symbol distance (e.g. the $l_{12}$ norm of the difference of every pair of mean color vectors) is below some preset threshold. The invalid pixels correspond to points that lie outside the projected space or that do not offer enough discrimination between the projected symbols (e.g. regions of black in the scene absorb the light).
4. In succession, project each coded light pattern onto the 3-D scene of interest and capture the result from all cameras (step 44). In other words, project $I_0(\bullet;m)$ and capture $I_k(\bullet;m)$ for camera k and light pattern m. It is important to ensure that there is proper synchronization between the projector and the cameras.
5. For every light pattern, decode the symbol at each valid pixel in every image (step 46). Because of illumination variations and different reflectance properties across the object, the decision thresholds vary for every image pixel. The reference images from step 2 help to establish a rough estimate of the symbols at every image pixel. Every valid pixel is assigned the symbol corresponding to the smallest absolute difference between the perceived color from the captured light pattern and each of the symbol mean colors. The symbols at every image pixel are then estimated by clustering the perceived color and bit errors are corrected using filtering.
6. Go to step 44 and repeat until all light patterns in the series have been used (step 48). Build up bit sequences at each pixel in every image.
7. Warp the decoded bit sequences at each pixel in every image to the projection plane (step 50). The bit sequences contain the unique identifiers that are related to the coordinate information in the projection plane. The image pixel's location is noted and added to the coordinate in the projection plane array. To improve robustness and reduce sparseness in the projection plane array, entire quadrilateral patches in the image spaces, instead of single image pixels, may be warped to the projection plane using traditional computer graphics scanline algorithms. Once all images have been warped, the projection plane array may be traversed, and for any location in the array, the corresponding image pixels may be identified immediately across all images.

In the end, the correspondence mapping $M_{k0}(\bullet)$ between any camera k and the projection plane may be obtained, and these mapping may be combined as described above to give the correspondence mapping $M_{ij}(p)=M_{0j}(M_{i0}(p))$ between any pair of cameras i and j for all valid points p.

Figure 5:
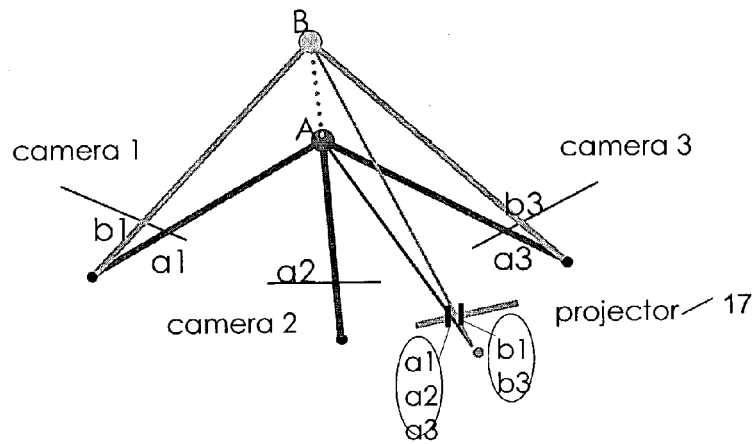
FIG. 5 is a 2-D (two-dimensional) depiction of a three-camera system.

Referring to FIG. 5, in one exemplary illustration of a 2-D depiction of a three-camera system, correspondence, occlusions, and visibility among all cameras may be computed automatically with the above-described approach without additional computation as follows. The light projector 17 shines multiple coded light patterns to encode the location of the two points, points A and B. These patterns are decoded in each of the three cameras. Scanning through each camera in succession, it is found that point a1 in camera 1 maps to the first location in the projection plane while b1 maps to the second location in the projection plane. Likewise for camera 3, points a3 and b3 map to the first and second locations, respectively, in the projection plane. Finally, a2 in camera 2 maps to the first location, and it is found that there are no other image pixels in camera 2 that decode to the second location because the scene point corresponding to the second location in the projection plane is occluded from camera 2's viewpoint. An array may be built up in the projection plane that keeps track of the original image pixels and traverse this array to determine correspondences. The first location in the projection plane contains the three image pixels a1, a2, and a3, suggesting that (a) all three cameras can see this particular point A, and (b) the three image pixels all correspond to one another. The second location in the projection plane contains the two image pixels b1 and b3 implying that (a) cameras 1 and 3 can view this point B, (b) the point must be occluded in camera 2, and (c) only b1 and b3 correspond.

The above-described coded light pattern LUMA embodiments provide numerous benefits. Dense correspondences and visibility may be computed directly across multiple cameras without additional computationally intensive searching. The correspondences may be used immediately for view interpolation without having to perform any calibration. True 3-D information also may be obtained with an additional calibration step. The operations are linear for each camera and scales automatically for additional cameras. There also is a huge savings in computation using coded light patterns for specifying projection plane coordinates in parallel. For example, for a 1024×1024 projection plane, only 22 binary colored light patterns (including the two reference patterns) are needed. In some implementations, with video rate (30 Hz) cameras and projector, a typical scene may be scanned in under three seconds.

Given any camera in the set up, only scene points that are visible to that camera and the projector are captured. In other words, only the scene points that lie in the intersection of the visibility frustum of both systems may be properly imaged. Furthermore, in view interpolation and 3-D shape recovery applications, only scene points that are visible in at least two cameras and the projector are useful. For a dual-camera set up, the relative positions of the cameras and the projector dictate how sparse the final correspondence results will be. Because of the scalability of these LUMA embodiments, this problem may be overcome by increasing the number of cameras.

B. Coded Light Patterns
1. Binary Light Patterns

Referring back to FIG. 3, in the illustrated embodiment, the set of coded light patterns 36 separate the reference coordinates into column and row: one series of patterns to identify the column and another series to identify the row. Specifically, a set of K+L binary images representing each bit plane is displayed, where $K=\log_2(w)$ and $L=\log_2(h)$ for a w×h projection plane. This means that the first of these images (coarsest level) consists of a half-black-half-white image while the last of these images (finest level) consists of alternating black and white lines. To make this binary code more error resilient, the binary representation may be converted to a Gray code using known Gray-coding techniques to smooth black-white transition between adjacent patterns. In this embodiment, reference patterns consisting of a fullillumination ("all white") pattern, and an ambient ("all black") pattern are included. Note that only the intensity of the images is used for estimation since the patterns are strictly binary.

2. Multicolor Light Patterns

Figure 6:
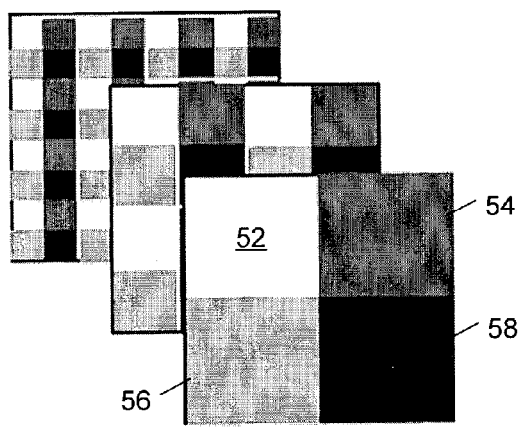
FIG. 6 is a diagrammatic view of an embodiment of a set of multicolor light patterns.

Referring to FIG. 6, in another embodiment, a base-4 encoding includes different colors (e.g., white 52, red 54, green 56, and blue 58) to encode both vertical and horizontal positions simultaneously. In this manner, only N base-4 images are required, where $N=\log_4(w \times h)$. An exemplary pattern is shown in FIG. 6 for an 8×8 reference grid. The upper left location in the reference grid consists of (white, white, white, white, white, white) for the base-2 encoding of FIG. 3 and (white, white, white) for the base-4 encoding of FIG. 6. The location immediately to its right in the projection plane is (white, white, white, white, white, black) for base-2 and (white, white, red) in the base-4 encoding, and so forth for other locations. In this embodiment, reference patterns consist of all white, all red, all green, and all blue patterns.

3. Error Resilient Light Patterns

To overcome decoding errors, error resiliency may be incorporated into the light patterns so that the transmitted light patterns may be decoded properly. While adding error resiliency will require additional patterns to be displayed and hence reduce the speed of the capture process, it will improve the overall robustness of the system. For example, in some embodiments, various conventional error protection techniques (e.g. pattern replication, (7, 4) Hamming codes, soft decoding, other error control codes) may be used to protect the bits associated with the higher spatial frequency patterns and help to recover single bit errors.

In some embodiments, which overcome problems associated with aliasing, a sweeping algorithm is used. As before, coded light patterns are first projected onto the scene. The system may then automatically detect the transmitted light pattern that causes too much aliasing and leads to too many decoding errors. The last pattern that does not cause aliasing is swept across to discriminate between image pixels at the finest resolution.

Figures 7A, 7B:
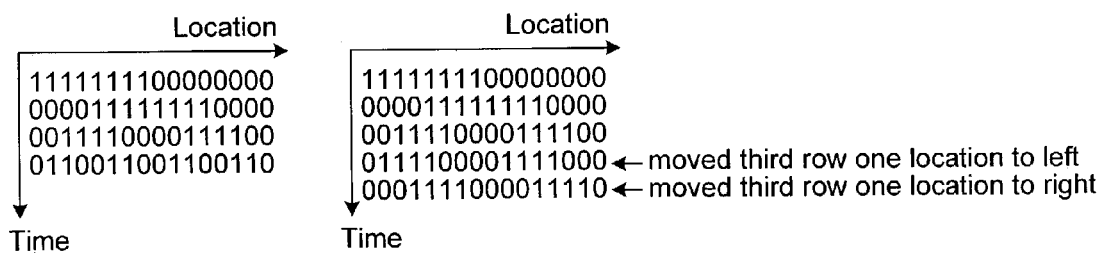
FIG. 7A is a diagrammatic view of an embodiment of a set of binary light patterns presented over time.
FIG. 7B is a diagrammatic view of an embodiment of a set of binary light patterns derived from the set of light patterns of FIG. 7A presented over time.

Referring to FIG. 7A, in one exemplary four-bit Gray code embodiment, each row corresponds to a light pattern that is projected temporally while each column corresponds to a different pixel location (i.e., the vertical axis is time and the horizontal axis is spatial location). Suppose the highest resolution pattern (i.e. very last row) produces aliasing. In this case, a set of patterns is used where this last row pattern is replaced by two new patterns, each consisting of the third row pattern "swept" in key pixel locations; the new pattern set is displayed in FIG. 7B. Notice that the new patterns are simply the third row pattern moved one location to the left and right, respectively. In these embodiments, the finest spatial resolution pattern that avoids aliasing is used to sweep the remaining locations. This approach may be generalized to an arbitrary number of light patterns with arbitrary spatial resolution. In some embodiments, a single pattern is swept across the entire spatial dimension.

C. Mapping Multipixel Regions

In the above-described embodiments, the same physical point in a scene is exposed to a series of light patterns, which provides its representation. A single camera may then capture the corresponding set of images and the processing system may decode the unique identifier representation for every point location based on the captured images. The points seen in the image may be mapped directly to the reference grid without any further computation. This feature is true for any number of cameras viewing the same scene.

The extracted identifiers are consistent across all the images. Thus, a given point in one camera may be found simply by finding the point with the same identifier; no additional computation is necessary. For every pair of cameras, the identifiers may be used to compute dense correspondence maps. Occlusions are handled automatically because points that are visible in only one camera will not have a corresponding point in a second camera with the same identifier.

In some embodiments, the coded light patterns encode individual point samples in the projection plane. As mentioned in the multiframe correspondence estimation method described above in connection with FIG. 4, these positions are then decoded in the capture planes and warped back to the appropriate locations in the projection plane. In the following embodiments, a correspondence mapping between multipixel regions in a capture plane and corresponding regions in a projection plane are computed in ways that avoid problems, such as sparseness and holes in the correspondence mapping, which are associated with approaches in which correspondence mappings between individual point samples are computed.

1. Mapping Centroids

Figure 8:
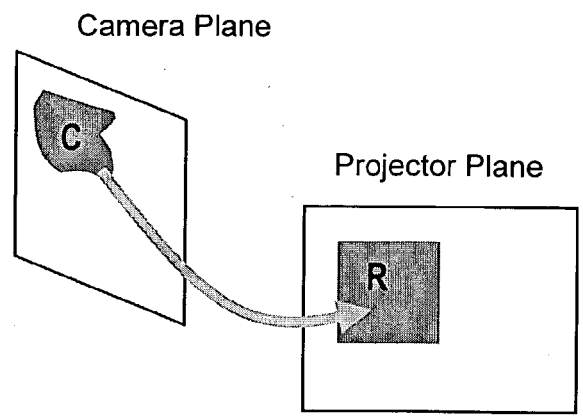
FIG. 8 is a diagrammatic view of a mapping of a multipixel region from camera space to the projection plane.

Referring to FIG. 8, in some embodiments, the centroids of neighborhoods in a given camera's capture plane are mapped to corresponding centroids of neighborhoods in the projection plane. The centroids may be computed using any one of a wide variety of known techniques. One approach to obtain this mapping is to assume a translational model as follows:

Compute the centroid $(u_c, v_c)$ and approximate dimensions $(w_c, h_c)$ of the current cluster C in a given capture plane.

Compute the centroid $(u_r, v_r)$ and approximate dimensions $(w_r, h_r)$ of the corresponding region R in the projection plane.

Map each point (u,v) in C to a new point in R given by $(w_c*(u-u_c)+u_r, w_r*(v-v_c)+v_r)$. That is, the distance the point in C is away from the centroid is determined and the mapping is scaled to fit within R.

In some embodiments, hierarchical ordering is used to introduce scalability to the correspondence results. In these embodiments, the lowest resolution patterns are first projected and decoded. This provides a mapping between clusters in the cameras' space to regions in the projection plane. The above-described mapping algorithm may be applied at any resolution. Even if not all the light patterns are used, the best mapping between the cameras and the projector may be determined by using this method. This mapping may be computed for every resolution, thereby creating a multiresolution set of correspondences. The correspondence mapping then may be differentially encoded to efficiently represent the correspondence. The multiresolution set of correspondences also may serve to validate the correspondent for every image pixel, since the correspondence results should be consistent across the resolutions.

In these embodiments, local smoothness may be enforced to ensure that the correspondence map behaves well. In some embodiments, other motion models (e.g. affine motion, splines, homography/perspective transformation) besides translational may be used to improve the region mapping results.

2. Mapping Corner Points

Figure 9:
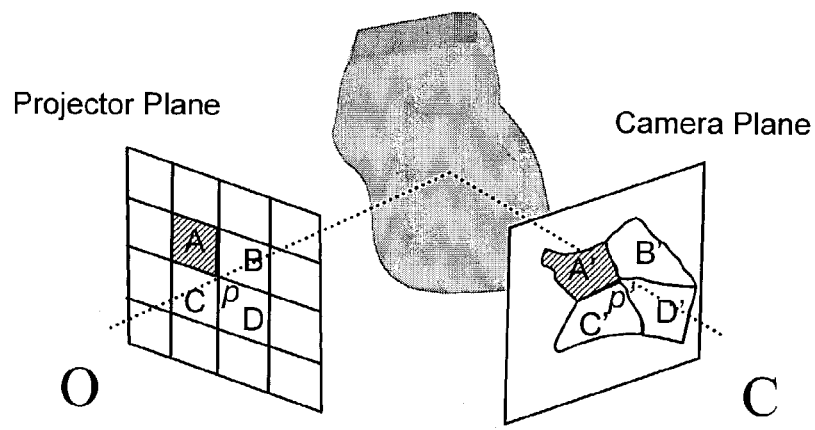
FIG. 9 is a diagrammatic view of a mapping of corner points between multipixel regions from camera space to the projection plane.

Referring to FIG. 9, in an exemplary 4×4 projection plane embodiment, after decoding, the set of image points A' is assigned to rectangle A in the projection plane, however the exact point-to-point mapping remains unclear. Instead of mapping interior points, the connectedness of the projection plane rectangles is exploited to map corner points that border any four neighboring projection plane rectangles. For example, the corner point p that borders A, B, C, D in the projection plane corresponds to the image point that borders A', B', C', D', or in other words, the so-called imaged corner point p'.

Figure 10:
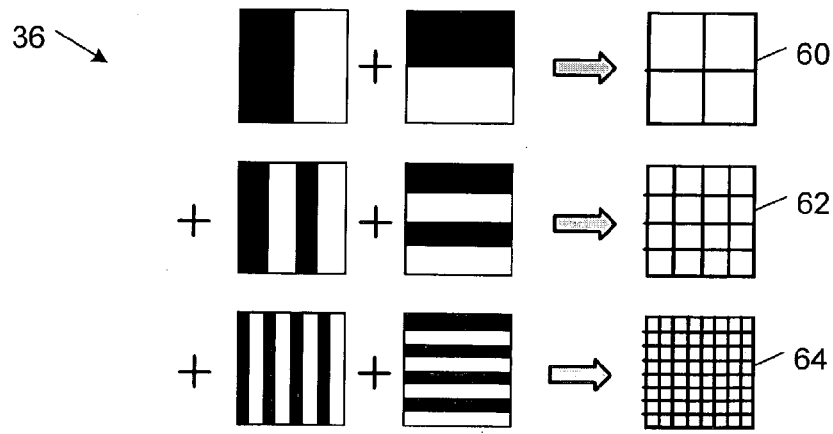
FIG. 10 is a diagrammatic view of an embodiment of a set of multiresolution binary light patterns.

As shown in FIG. 10, the coded light patterns 36 of FIG. 3 exhibit a natural hierarchical spatial resolution ordering that dictates the size of the projection plane rectangles. The patterns are ordered from coarse to fine, and each associated pair of vertical-horizontal patterns at the same scale subdivides the projection plane by two in both directions. Using the coarsest two patterns alone results in only a 2×2 projection plane 60. Adding the next pair of patterns increases the projection plane 62 to 4×4, with every rectangle's area reduced by a fourth, and likewise for the third pair of patterns. All six patterns encode an 8×8 projection plane 64.

Figure 11:
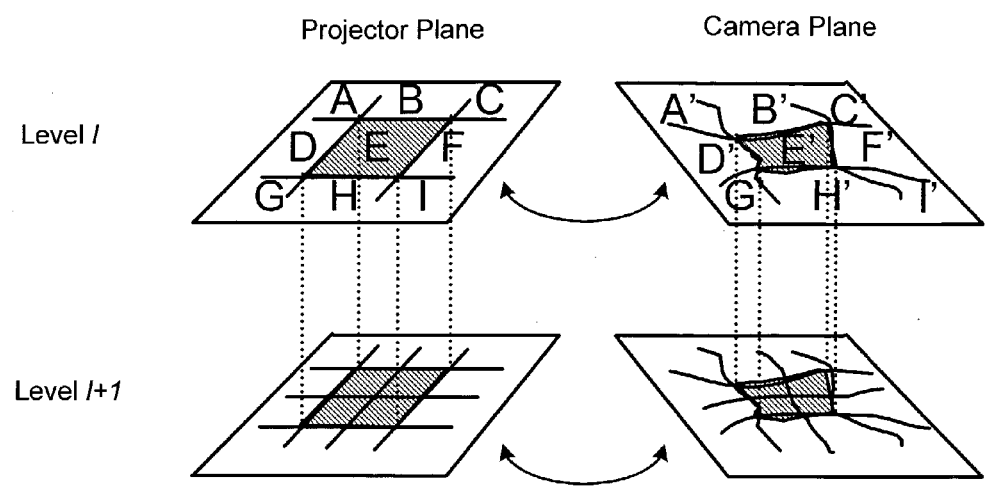
FIG. 11 is a diagrammatic view of multiresolution correspondence mappings between camera space and the projection plane.

Referring to FIG. 11, in some embodiments, since it may be difficult in some circumstances to locate every corner's match at the finest projection plane resolution, each corner's match may be found at the lowest possible resolution and finer resolutions may be interpolated where necessary. In the end, subpixel estimates of the imaged corners at the finest projection plane resolution are established. In this way, an accurate correspondence mapping from every camera to the projection plane may be obtained, resulting in the implicit correspondence mapping among any pair of cameras.

In these embodiments, the following additional steps are incorporated into the algorithm proposed in Section II.A. In particular, before warping the decoded symbols (step 50; FIG. 4), the following steps are performed.

1. Perform coarse-to-fine analysis to extract and interpolate imaged corner points at finest resolution of the projection plane. Define $B_k(q)$ to be the binary map for camera k corresponding to location q in the projection plane at the finest resolution, initially all set to 0. A projection plane location q is said to be marked if and only if $B_k(q)=1$. For a given resolution level l, the following substeps are performed for every camera k:
   a. Convert bit sequences of each image point to the corresponding projection plane rectangle at the current resolution level. For all valid points p, the first l decoded symbols are decoded and used to determine the coordinate (c,r) in the $2^{l+1} \times 2^{l+1}$ projection plane. For example, in the case of binary light patterns, the corresponding column c is simply the concatenation of the first l decoded bits, and the corresponding row r is the concatenation of the remaining bits. Hence, $M_{k0}(p) = (c,r)$.
   b. Locate imaged corner points corresponding to unmarked corner points in the projection plane. Suppose valid point p in camera k maps to unmarked point q in the projection plane. Then, p is an imaged corner candidate if there are image points within a 5×5 neighborhood that map to at least three of q's neighbors in the projection plane. In this way, the projection plane connectivity may be used to overcome possible decoding errors due to specularities and aliasing. Imaged corners are found by spatially clustering imaged corner candidates together and computing their subpixel averages. Set $B_k(q)=1$ for all corner points q at the current resolution level.
   c. Interpolate remaining unmarked points in the projection plane at the current resolution level. Unmarked points with an adequate number of defined nearest neighbors are bilaterally interpolated from results at this or coarser levels.
   d. Increment l and repeat steps a–c for all resolution levels
      l. The result is a dense mapping $M_{0k}(\cdot)$ of corner points in the projection plane to their corresponding matches in camera k.

In some embodiments, different known corner detection/extraction algorithms may be used.

2. Validate rectangles in the projection plane. For every point (c,r) in the projection plane, the rectangle with vertices $\{(c,r),(c+1,r),(c+1,r+1),(c,r+1)\}$ is valid if and only if all its vertices are marked and they correspond to valid points in camera k.

D. Identifying and Correcting Bit Errors

Although, for the most part, the coded light patterns may be decoded properly at every image pixel, decoding errors may occur. In some implementations, the main sources of decoding errors are specularities and aliasing.

1. Addressing Specularity Problems

In the case of specularities, regions in the scene reflect the illuminant to other portions of the scene. Because of this behavior, disjoint regions in the scene will decode to the same location in the projection plane. The artifact itself does not pose any problems but coupled with the sampling issues described above may lead to incorrectly computed centroids or corner points and hence incorrectly mapped correspondences. In some embodiments, the disjoint regions are filtered out and consistency is used to determine the correct mapping.

In some embodiments, the hierarchical nature of the above-described light patterns is exploited to handle decoding errors due to specularities, where surfaces in the scene reflect the incoming light to other parts of the scene, thereby causing multiple surfaces to incorrectly share the same code.

For example, the coded light patterns 36 of FIG. 3 include horizontal and vertical stripes at different spatial resolutions. Without loss of generality, consider only the vertical patterns; the horizontal patterns and more general 2-D patterns may be similarly considered. Every position in the decoded sequence of symbols for a given image pixel corresponds to one of the received light patterns. Ordering the light patterns according to resolution (coarse to fine) also orders the sequence of symbols (most significant symbol [MSS] to least significant symbol [LSS]). If only the MSS is considered for every image pixel, then the received light pattern is automatically clustered into N regions, where N represents the number of symbols. These clusters also refer to particular spatial regions in the projector's coordinate system. If the next most significant symbol is considered, then the received light pattern will be further clustered into a total of $N^2$ regions. Similarly, as more symbols are considered, the clusters are subdivided into smaller regions.

Clusters at one resolution typically should break into smaller, better-connected clusters at a finer resolution because, at finer resolutions, it is more likely that a given cluster will consist of points all from the same physical surface and not transcend depth boundaries. If, to the contrary, a cluster is found to break into two or more clusters with the same code, then part of the cluster may correspond to a specularity error. In some embodiments, a separable 1-D algorithm along both rows and columns may be employed to identify these situations at progressively finer resolutions. Iterative clustering algorithms then may be used to identify disparate clusters with the same code and eliminate the appropriate ones. In some implementations, this approach works fairly well for small regions of specularities.

Figure 12A:
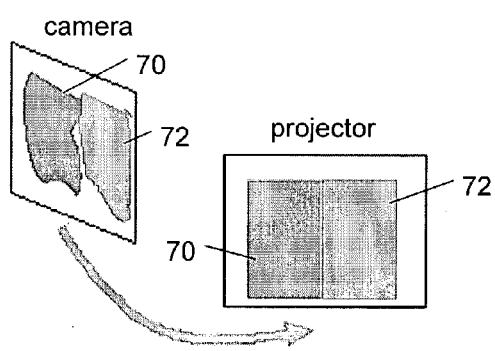
FIGS. 12A and 12B are diagrammatic views of correspondence mappings between camera space and the projection plane at different respective resolutions.
Figure 12B:
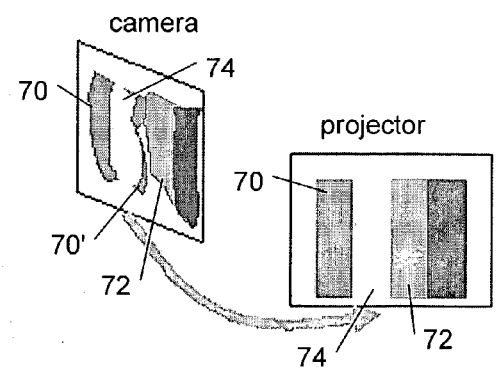

In one exemplary illustration, FIG. 12A shows the clustering in the projection and capture planes. Note that the different shades of gray are simply used to label corresponding clusters and are not necessarily the light symbols transmitted in the light patterns. The MSS is 0 for shade 70 and 1 for shade 72. The next most significant symbol is shown in FIG. 12B. In this case, there are now four regions/clusters. Because of specularities, there are small clusters of shade 70 that appear to above and to the right of shade 74. At this finer resolution, shade 70 in the camera space has fragmented into multiple regions 70, 70' with the same code. These regions are the ones that may be identified and filtered.

2. Addressing Aliasing Problems

As mentioned above, another source of decoding errors is aliasing. This phenomenon may occur, for example, when the spatial resolution of the projection plane is finer than that of the camera's dimensions. For example, a projector could have XGA (1024×768) dimensions while the cameras have VGA (640×480) resolution. Depending on the relative positions of the equipment, it is possible that the perceived spatial frequency of the light patterns is much higher than the sampling rate of the cameras. In this case, the cameras tend to capture aliasing artifacts in the form of moiré patterns. These patterns, in turn, cause decoding errors at many image pixels since the decoded light patterns now no longer correspond to the original symbol colors. In some embodiments, hybrid solutions are used. In these embodiments, coded light patterns are used until the lowest allowable spatial frequency is reached and then this last pattern is swept to encode the remaining positions.

In some embodiments, a confidence metric is computed for every decoded symbol. For example, in one embodiment, the $l_2$ norm between a received color vector and the mean color vector of the assigned symbol is used to compute the confidence metric. In practice, this distance typically is small for transmitted light patterns below the Nyquist sampling rate and hence the symbol can be properly decoded. However, the distance may become large (sometimes halfway between two symbols), especially when spatial aliasing occurs and along pattern spatial transitions. In some embodiments, the transmitted light patterns are ordered in sequence (with the Gray code representation, adjacent stripes differ in code by exactly one bit), in which case the potentially erroneous symbols of the decoded sequence are marked and the results from neighboring image pixels may be used to correct the erroneously decoded symbol, as follows (the following algorithm may be applied to every image pixel):

Determine the nearest symbol based on distance to the mean color vector.

If the distance (i.e. confidence metric) is greater than some predetermined threshold, then mark this symbol as erroneous. Keep track of both the decoded symbol sequence as well as an error sequence corresponding to each symbol.

After every image pixel has been examined, apply a recursive algorithm to correct the erroneous symbols using neighboring information. For example, for a given image pixel with an erroneous symbol, look at the corresponding symbol of each of its eight neighbors. If at least two of these symbols are not erroneous, then take the mean value of the symbols to produce the new symbol for the current image pixel. In an alternative approach, the median of the valid symbols is considered. These steps are repeated until every erroneous symbol is corrected or until no more image pixels can be corrected.

In the end, this recursive filtering process helps to reduce decoding error due to transitions or specularities.

III. Scanning Light Plane

The LUMA embodiments described below estimate correspondences based on light plane patterns that are swept across the 3-D scene of interest. These embodiments exploit constraints due to the active projection as well as inherent constraints to the geometry of the camera set up. For the purpose of the following discussion, it is assumed that the camera set up consists of only two cameras; the approach easily extends to more than two cameras.

Figure 13:
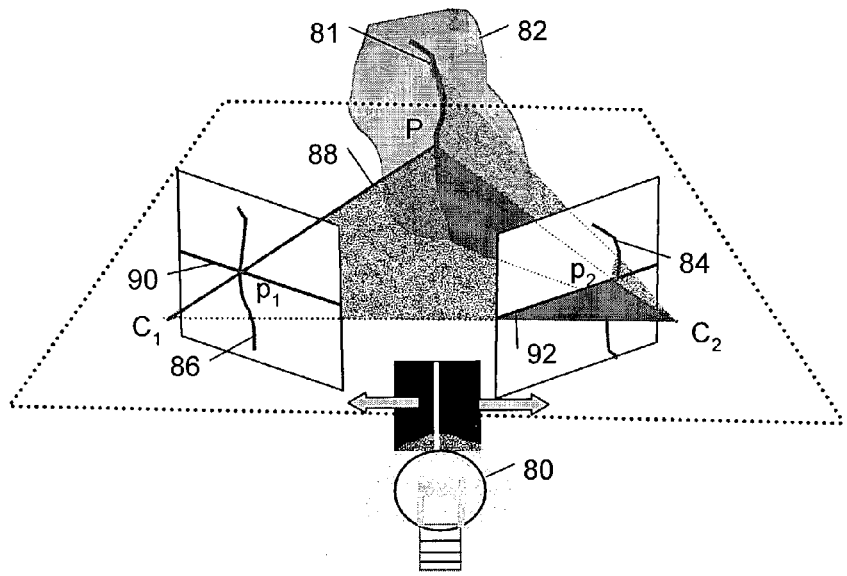
FIG. 13 is a diagrammatic view of an embodiment of a system for estimating a correspondence mapping.

As shown in FIG. 13, in some embodiments, a light source 80 (in this example, it is modeled as a general light source with a translating vertical slit filter) projects a vertical plane of light 81 onto the scene 82 of interest. The projection is captured and extracted in each of two cameras, which have respective centers $C_1$, $C_2$, as projected contours 84, 86. In general, any point along one camera's contour corresponds to some point constrained to lie along the second camera's 1-D contour. For example, a point P lying on the surface of the object illuminated by the vertical plane will project to image points ($p_1$ and $p_2$ in the example) that lie on the projected contours in both cameras $C_1$, $C_2$ as long as P is visible to both cameras.

A second constraint due to the epipolar geometry of the camera configuration also applies. A scene point P, along with the two camera centers, $C_1$ and $C_2$, form a 3-D plane 88 that passes through all three points. This virtual plane 88 crosses the two cameras' image planes and generally intersects at two so-called epipolar lines 90, 92. Any point lying along the epipolar line of one camera has a corresponding point constrained to lie along the associated 1-D epipolar line of the second camera. For any point in one camera, its corresponding point must satisfy both constraints simultaneously.

Figure 14:
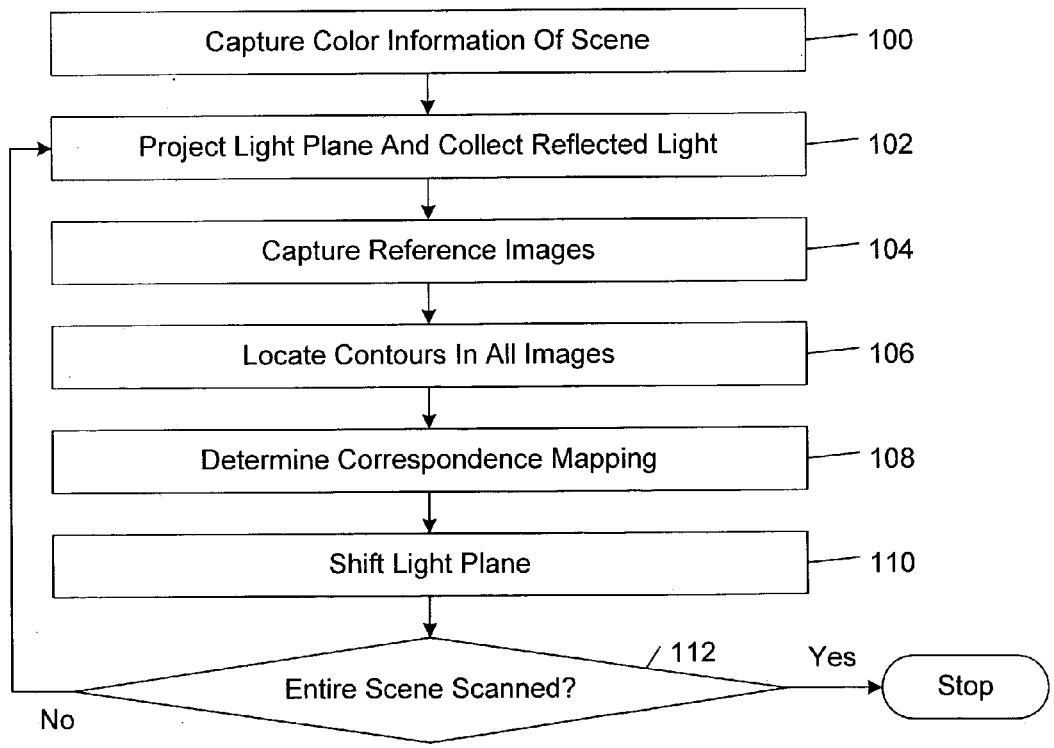
FIG. 14 is a flow diagram of an embodiment of a method for estimating a correspondence mapping.

Referring to FIG. 14, in some embodiments, a pair-wise correspondence mapping is computed using the system of FIG. 13, as follows:

1. Capture the color information of the scene from all cameras (step 100). These images serve as the color texture maps for the final results.
2. Project a single light plane onto the scene of interest and capture from all cameras (step 102).
3. Disable the light plane and capture reference images from all cameras (step 104).
4. Perform difference imaging to locate the contours in all images (step 106). The reference images from step 104 are used to quickly identify the location of the projected contours. Usually, the image captures occur in a much darker setting to ensure better contrast and more reliable results. In some embodiments, morphological dilation and thinning techniques are applied to improve the overall fidelity of the extracted contours.
5. Traverse the contour points in one image and match the corresponding points in the second image (step 108). As described above, a given contour point in one image has a corresponding point in the second image that is constrained to lie along both the projected contour and the appropriate epipolar line. Since the two constraints are independent (i.e. the lines are not parallel), their intersection is precisely the corresponding point.

In some embodiments, to simplify the procedure, complete point lists are formed for all contour points with respect to each camera. Then, for every point p in the first image, its correspondent q in the other image may be found by traversing the appropriate list and solving for the epipolar constraint. The epipolar geometry for the two views may be represented as a single 3×3 matrix F, which is called the fundamental matrix. The signed distance d of a candidate contour point q' in the second image to the epipolar line given by the projective expression $d=q'^T F p$ may be determined (in this case, both p and q' are defined in homogeneous coordinates). Note that this distance d is zero when the candidate point lies on the epipolar line, and hence is the corresponding match to p. In some embodiments, all candidate points are traversed and the absolute distance is minimized as long as it lies within some predetermined tolerance.

The above-described algorithm does not enforce a one-to-one mapping for contour points (i.e., multiple contour points of one image may be found to map to the same contour point in the second image). In other embodiments, the problem is cast as a global optimization and solved using dynamic programming. In another approach, minimization is performed starting with the second image to ensure that the two image points p and q are truly correspondents of each other. In some embodiments, the projective expression is sped up immensely using look up tables.

6. Shift the light plane to the next position (step 110). Go to step 102 and repeat until the light plane has swept the entire width of the object (step 112).

In the end, a dense mapping between image points in the first camera's coordinate system to those in the second camera's coordinate system is produced. In the illustrated embodiments, it is assumed the scene of interest is fixed in position and does not move relative to the imaging set up. Note also that a light source that is computer-controlled makes it easier to identify the projected contours and discern the correct object color but is not necessary.

The above-described sweeping light plane embodiments produce dense correspondences automatically from a single viewpoint. It is a reasonably flexible technology that is independent of both light source location and orientation of light plane. The light source typically should be conveniently located and oriented, ideally placed to maximize visibility by the cameras. The light planes may be oriented arbitrarily but they should not be parallel to epipolar lines. The light plane orientation in the above-described embodiments is orthogonal to any given epipolar line.

The resulting correspondence information may be used directly for view interpolation after weak calibration (i.e. knowledge about the fundamental matrix or epipolar geometry must be established). With strong calibration (i.e. all camera parameters known or estimated), true 3-D information may be computed through triangulation.

Using this approach, in one implementation, an average-sized object (e.g., a human face) may be scanned with roughly 200–300 light plane patterns and may be captured in about a minute. The resolution of the final results depends on the camera resolution.

This approach also may be used with a single camera with respect to the projector's coordinate system given weak calibration between the two coordinate systems. For an imaged contour point in the capture plane, its correspondent is determined simply by intersecting the corresponding contour in the projection plane with the appropriate epipolar line. In this manner, dense correspondences between any camera and the projection plane may be established, thereby producing a computationally scalable approach to solve for multiframe correspondences among any number of cameras.

IV. Turntable-Based Embodiments

Figure 15:
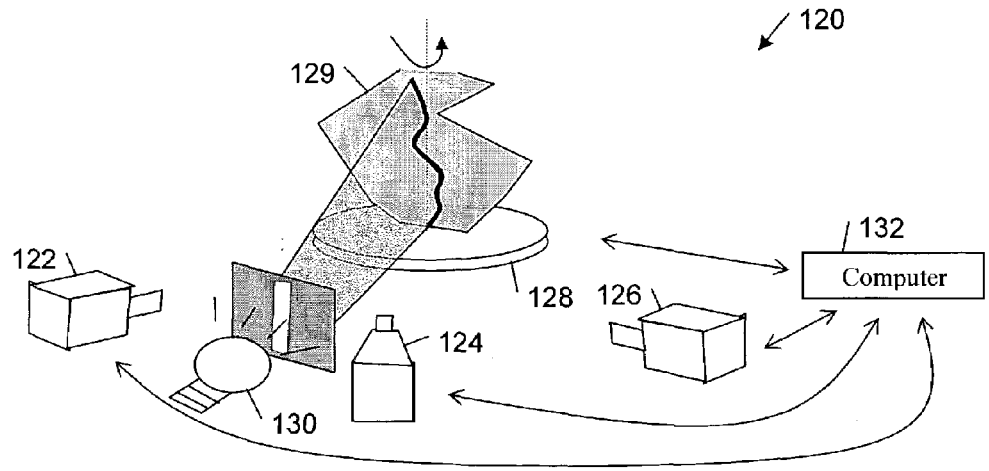
FIG. 15 is a diagrammatic view of an embodiment of a system for estimating a correspondence mapping.

Referring to FIG. 15, in some embodiments, a multiframe correspondence system 120 includes multiple stationary computer-controlled imaging devices 122, 124, 126 (e.g., digital cameras or video cameras), a computer-controlled turntable 128 on which to place the object 129 of interest, a fixed lighting source 130 (e.g. strong colored incandescent light projector with vertical slit filter, laser beam apparatus with vertical diffraction, light projector) that is controlled by a computer 132. The cameras 122–126 are placed relatively close to one another and oriented toward the turntable 128 so that the object 129 is visible. The light source 130 projects a series of light patterns from the source. The projected light is easily detected on the object. In the illustrated embodiment, the actual location of the light source 130 need not be estimated.

Figure 16:
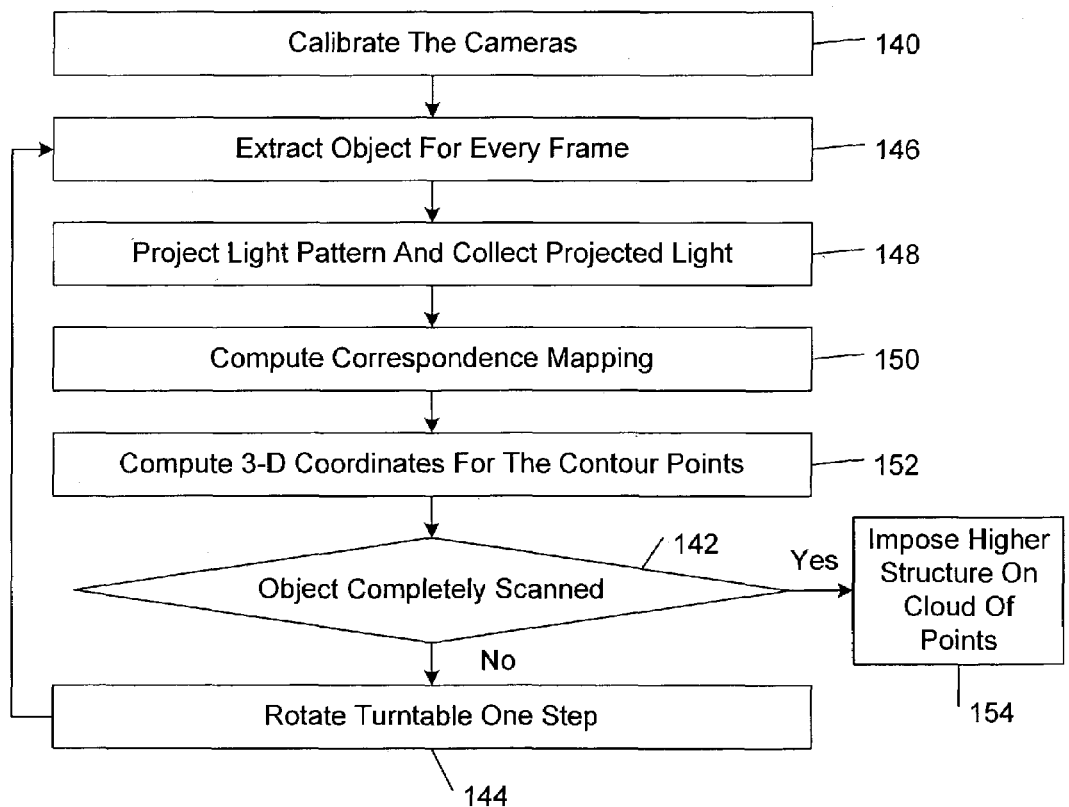
FIG. 16 is a flow diagram of an embodiment of a method for estimating a correspondence mapping.

Referring to FIG. 16, in some embodiments, the embodiments of FIG. 15 may be operated as follows to compute 3-D structure. For the purpose of the following description, it is assumed that there are only two cameras; the general case is a straightforward extension. It is also assumed that one of the camera viewpoints is selected as the reference frame. Let T be the number of steps per revolution for the turntable.

1. Calibrate the cameras (step 140). Standard calibration techniques may be sued to determine the relative orientation, and hence the epipolar geometry, between the cameras from a known test pattern. The location of the turntable center is estimated by projecting the center to the two views and triangulating the imaged points.

2. For every step j=1:T (steps 142, 144),
   a. Perform object extraction for every frame (step 146). This is an optional step but may lead to more reliable 3-D estimation. The turntable is first filmed without the object to build up statistics on the background. For better performance, a uniform colored background may be added. Then, at every step and for both views, the object is identified as the points that differ significantly from the background statistics.
   b. Project and capture light patterns in both views (step 148) and compute a correspondence mapping (step 150). Any of the above-described coded light pattern and sweeping light plane embodiments may be used in this step.
   c. Compute 3-D coordinates for the contour points (step 152). With the estimated relative orientation of the cameras, this computation is straightforward by triangulation of the corresponding points. The color for the corresponding scene point comes from the multiple views and may be used for view dependent texture mapping.

3. Impose some higher structure on the resulting cloud of points (step 154). Traditional triangular tessellations may be used to generate a model of the object. Note that the center and rotational angle of the turntable are important in order to form a complete and consistent model; the center's location is obtained above and the angle is simply computed from the number of steps per revolution. The 3-D model may be formed by formulating the model directly or by stitching together partial mesh estimates together.

In some implementations, the quality of the scan will depend on the accuracy of the calibration step, the ability to discriminate the projected light on the object, and the reflectance properties of the scanned object.

V. Iterative Multiframe Correspondence Estimation

Figure 17:
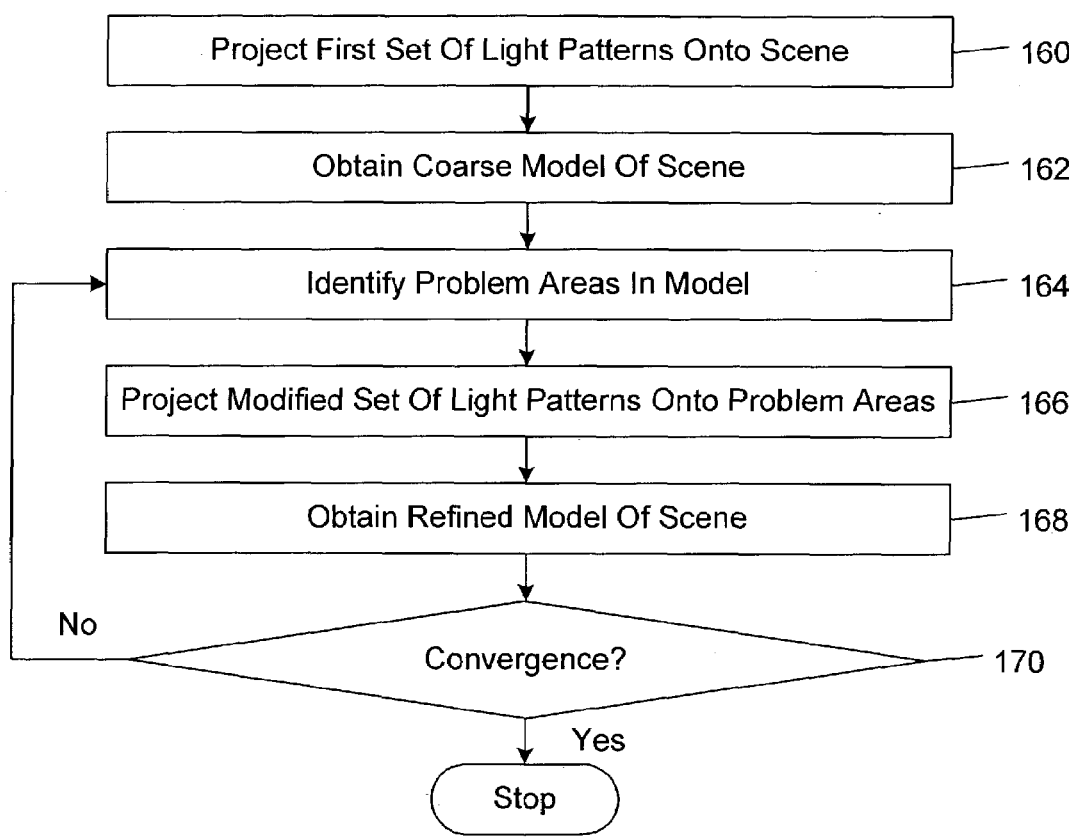
FIG. 17 is a flow diagram of an embodiment of a method for estimating a correspondence mapping.

Referring to FIG. 17, in some embodiments, active feedback is incorporated into the above-described multiframe correspondence mapping embodiments to improve three-dimensional (3-D) modeling of an object of interest. In these embodiments, basic shape recovery is achieved by projecting a first set of light patterns onto the scene and then detecting the projected light patterns (step 160). Based on the detected light patterns, a coarse model of the object is obtained (step 162). Next, problem areas like holes and poorly sampled areas are identified in the model (step 164). The system then projects modified light patterns that focus in on these areas (step 166) and capture their projections to obtain a refined model of the object (step 168). For example, finer grid patterns or cross-like patterns that sample every point in a given area may be projected. With known patterns, it is straightforward to estimate and predict the projected locations to sub-pixel accuracy, as described above. These steps are repeated until convergence (step 170). The result is an increase in the accuracy with which correspondences may be estimated through active feedback.

Further improvements may be made for objects that are well understood. One example is a human face. Based on prior experience, areas on a face that are troublesome for 3-D shape recovery (e.g., on the sides of the nose) may be identified immediately and directly targeted. For example, the above-described systems may obtain a coarse face model, do a rough estimation of the location of the eyes and nose, and then focus in on the troublesome areas. The light patterns may be tuned specifically for human faces a priori to give the best results.

V. Other Embodiments

Other embodiments are within the scope of the claims.

The systems and methods described herein are not limited to any particular hardware or software configuration, but rather they may be implemented in any computing or processing environment, including in digital electronic circuitry or in computer hardware, firmware, or software.

What is claimed is:

1. A method of multiframe correspondence estimation, comprising:
projecting onto a scene a sequence of patterns of light symbols that temporally encode two-dimensional position information in a projection plane with unique light symbol sequence codes;
capturing at a capture plane light patterns reflected from the scene; and
computing a correspondence mapping between multipixel regions in the capture plane and corresponding regions in the projection plane based at least in part on correspondence between light symbol sequence codes captured at the capture plane and light symbol sequence codes projected from the projection plane.

2. The method of claim 1, wherein among the projected light symbol patterns are light patterns respectively comprising different spatial variations of light in the projection plane.

3. The method of claim 2, wherein each light symbol pattern comprises a binary pattern of light and dark rectangular stripe symbols.

4. The method of claim 3, wherein each light symbol pattern includes light and dark stripe symbols of substantially equal size in the projection plane, and light and dark stripe symbols of different light symbol patterns are of substantially different size in the projection plane.

5. The method of claim 3, wherein a first subset of light symbol patterns encodes rows of a reference grid in the projection plane, and a second subset of light symbol patterns encodes columns of the reference grid in the projection plane.

6. The method of claim 5, wherein each light symbol pattern encodes position information with a respective spatial resolution, and light symbol patterns of each of the first and second subsets exhibit a hierarchy of spatial resolutions from coarse to fine.

7. The method of claim 6, wherein symbol light patterns are projected onto scene in order from coarse resolution to fine resolution.

8. The method of claim 7, wherein each light symbol sequence code corresponds to a binary number that directly encodes a row number and a column number for each region in the reference grid.

9. The method of claim 7, further comprising identifying an error producing light pattern resolution associated with a decoding error count greater than a selected threshold.

10. The method of claim 9, wherein projecting light patterns comprises projecting light patterns in order from the coarse resolution to a resolution just coarser than the identified error producing light pattern resolution.

11. The method of claim 10, wherein projecting light patterns comprises projecting multiple unique light patterns each having a common resolution just coarser than the identified error producing light pattern resolution.

12. The method of claim 2, wherein each light pattern comprises a multicolor pattern of light.

13. The method of claim 1, wherein computing a correspondence mapping comprises mapping centroids of light symbol regions in the capture plane to centroids of corresponding light symbol regions in the projection plane.

14. The method of claim 1, wherein computing a correspondence mapping comprises mapping corner points of light symbol regions in the capture plane to corresponding corner points of light symbol regions in the projection plane.

15. The method of claim 14, wherein mapping corner points comprises interpolating corner points in the capture plane at a given light symbol pattern resolution level based at least in part on corner points identified in the capture plane at a coarser light symbol pattern resolution level.

16. The method of claim 1, wherein computing a correspondence mapping comprises determining light symbol code sequences captured at different regions of the capture plane.

17. The method of claim 16, wherein each light symbol pattern comprises light selected from a prescribed set of light colors each representing a respective code symbol.

18. The method of claim 17, wherein determining a code symbol sequence comprises assigning to a given pixel a symbol color most likely to correspond to a light color captured at the given pixel based on a measure of distance of a light color captured at the given pixel from a mean color metric computed for the most likely symbol color.

19. The method of claim 17, wherein determining a code symbol sequence comprises labeling a given pixel as indeterminate based on a measure of distance of a light color captured at the given pixel from a mean color metric computed for a symbol color most likely to correspond to the light color captured at the given pixel.

20. The method of claim 19, further comprising correcting an indeterminate pixel based on symbols assigned to neighboring determinate pixels.

21. The method of claim 1, further comprising filtering out a given captured light symbol based on an assessment of consistency of the given captured light symbol.

22. The method of claim 21, wherein captured light symbols divided into two or more regions are filtered out.

23. The method of claim 1, further comprising rotating an object in the scene about an axis.

24. A system of multiframe correspondence estimation, comprising:
a light source operable to project onto a scene a sequence of patterns of light symbols that temporally encode two-dimensional position information in a projection plane with unique light symbol sequence codes;
at least one camera operable to capture at a capture plane light patterns reflected from the scene; and
a processing system operable to compute a correspondence mapping between multipixel regions in the capture plane and corresponding regions in the projection plane based at least in part on correspondence between light symbol sequence codes captured at the capture plane and light symbol sequence codes projected from the projection plane.

25. A method of multiframe correspondence estimation, comprising:
projecting onto a scene a sequence of patterns of light symbols that temporally encode two-dimensional position information in a projection plane with unique light symbol sequence codes, wherein at least two light patterns encode position information at different spatial resolutions;
capturing at a capture plane light patterns reflected from the scene; and
computing a correspondence mapping between the capture plane and the projection plane based at least in part on correspondence between light symbol sequence codes captured at the capture plane and light symbol sequence codes projected from the projection plane.

26. The method of claim 25, wherein light symbol patterns are projected onto scene in order from coarse resolution to fine resolution.

27. The method of claim 26, wherein each light symbol sequence code corresponds to a binary number that directly encodes a row number and a column number for each region in the reference grid.

28. The method of claim 26, further comprising identifying an error producing light pattern resolution associated with a decoding error count greater than a selected threshold.

29. The method of claim 28, wherein projecting light patterns comprises projecting light patterns in order from the coarse resolution to a resolution just coarser than the identified error producing light pattern resolution.

30. The method of claim 29, wherein projecting light patterns comprises projecting multiple unique light patterns each having a common resolution just coarser than the identified error producing light pattern resolution.

31. The method of claim 25, wherein computing a correspondence mapping comprises mapping points in the capture plane to corresponding points in the projection plane at multiple spatial resolution levels to obtain a set of multiresolution correspondences.

32. The method of claim 31, further comprising validating the computed correspondence mapping based at least in part on consistency of point mappings in the set of multiresolution correspondences.

33. The method of claim 25, further comprising rotating an object in the scene about an axis.

34. A system of multiframe correspondence estimation, comprising:
a light source operable to project onto a scene a sequence of patterns of light symbols that temporally encode two-dimensional position information in a projection plane with unique light symbol sequence codes, wherein at least two light patterns encode position information at different spatial resolutions;
at least one camera operable to capture at a capture plane light patterns reflected from the scene; and
a processing system operable to compute a correspondence mapping between the capture plane and the projection plane based at least in part on correspondence between light symbol sequence codes captured at the capture plane and light symbol sequence codes projected from the projection plane.

35. A method of multiframe correspondence estimation, comprising:
projecting a plane of light onto a scene from a projection plane;
sweeping the plane of light across the scene;
capturing light contours reflected from the scene at a capture plane related by epipolar geometry with respect to the projection plane; and
computing a correspondence mapping between the capture plane and the projection plane based at least in part on intersection of captured light contours and epipolar lines computed for the capture plane and the projection plane.

36. A method of multiframe correspondence estimation, comprising:
projecting a plane of light onto a scene;
sweeping the plane of light across the scene;
capturing light contours reflected from the scene at multiple capture planes each pair of which is related by epipolar geometry with respect to the scene; and
computing a correspondence mapping between each pair of capture planes based at least in part on intersection of captured light contours and epipolar lines computed for each of the capture planes.

37. The method of claim 36, further comprising computing estimates of relative position coordinates of capture planes.

38. The method of claim 37, further comprising computing three-dimensional coordinates for contour points of the scene based at least in part on the computed correspondence mapping and the computed estimates of relative positions of capture planes.

39. The method of claim 36, wherein sweeping the plane of light comprises rotating an object about an axis.

40. The method of claim 39, wherein the object is rotated in discrete steps, and a correspondence mapping is computed at each rotational step.

41. A system of multiframe correspondence estimation, comprising:
a light source operable to project a plane of light onto a scene and to sweep the plane of light across the scene;
at least two cameras operable to capture light contours reflected from the scene at multiple capture planes each pair of which having an epipolar geometric orientation with respect to the scene; and
a processing system operable to compute a correspondence mapping between each pair of capture planes based at least in part on intersection of captured light contours and epipolar lines computed for each of the capture planes.

42. A method of multiframe correspondence estimation, comprising:
   projecting a first light pattern onto a scene;
   capturing at a capture plane light patterns reflected from the scene;
   computing a coarse correspondence mapping between the capture plane and a reference plane based at least in part on the captured light patterns;
   identifying one or more undersampled regions of the scene based at least in part on the computed coarse correspondence mapping;
   projecting onto the undersampled regions of the scene a second light pattern different from the first light pattern; and
   computing a refined correspondence mapping between the capture plane and the reference plane based at least in part on the light patterns captured during projection of the second light pattern.

43. The method of claim 42, wherein projecting a first light pattern comprises projecting onto a scene a sequence of patterns of light symbols that temporally encode two-dimensional position information in a projection plane with unique light symbol sequence codes.

44. The method of claim 42, wherein projecting a first light pattern comprises projecting onto a scene a sequence of patterns of light symbols that temporally encode two-dimensional position information in a projection plane with unique light symbol sequence codes, wherein at least two light patterns encode position information at different spatial resolutions.

45. The method of claim 42, wherein projecting a first light pattern comprises projecting a plane of light onto a scene.

46. A system of multiframe correspondence estimation, comprising:
   a light source operable to project onto a scene a first light pattern and a second light pattern different from the first light pattern;
   at least one camera operable to capture at a capture plane light patterns reflected from the scene; and
   a processing system operable to compute a coarse correspondence mapping between the capture plane and a reference plane based at least in part on captured light patterns corresponding to the first light pattern, identify one or more undersampled regions of the scene based at least in part on the computed coarse correspondence mapping, and compute a refined correspondence mapping between the capture plane and the reference plane based at least in part on the light patterns captured during projection of the second light pattern.

* * * * *